US007666086B2

(12) United States Patent
Baerlocher

(10) Patent No.: US 7,666,086 B2
(45) Date of Patent: Feb. 23, 2010

(54) GAMING DEVICE HAVING SELECTION PICKS AND SELECTION OUTCOMES DETERMINED BASED ON A WAGER

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 791 days.

(21) Appl. No.: 10/660,809

(22) Filed: Sep. 11, 2003

(65) Prior Publication Data

US 2005/0060050 A1 Mar. 17, 2005

(51) Int. Cl.
*A63F 13/00* (2006.01)

(52) U.S. Cl. ............................ 463/20; 463/16; 463/17; 463/18; 463/19; 463/37

(58) Field of Classification Search ............. 463/16–20, 463/37
See application file for complete search history.

(56) References Cited

U.S. PATENT DOCUMENTS

| | | | | |
|---|---|---|---|---|
| 4,624,459 A | | 11/1986 | Kaufman | |
| 4,669,731 A | | 6/1987 | Clarke | |
| 4,695,053 A | | 9/1987 | Vazquez, Jr. et al. | |
| 4,799,062 A | * | 1/1989 | Sanderford et al. | 342/450 |
| 4,991,848 A | | 2/1991 | Greenwood et al. | |
| 5,116,055 A | | 5/1992 | Tracy | |
| 5,231,568 A | * | 7/1993 | Cohen et al. | 463/17 |
| 5,344,144 A | | 9/1994 | Canon | |

(Continued)

FOREIGN PATENT DOCUMENTS

| | | |
|---|---|---|
| AU | 771847 | 3/2001 |
| GB | 2137392 | 10/1984 |
| WO | WO 85/00910 | 2/1985 |
| WO | WO 2005/083599 | 9/2005 |

OTHER PUBLICATIONS

3RV—Jackpot Party Advertisement written by WMS Gaming, Inc., published Aug. 8, 2002.

(Continued)

*Primary Examiner*—James S. McClellan
*Assistant Examiner*—Sunit Pandya
(74) *Attorney, Agent, or Firm*—K & L Gates LLP

(57) ABSTRACT

A gaming device having a bonus game which is changed based on a wager in the base game. A wager in the base game determines if outcomes introducing other types of games into the bonus game are available to the player. In one embodiment, a plurality of masked player-selectable selections are presented to the player. A wager made by the player in the base game determines the number of picks of the selections provided to the player, and the wager determines the type of award or outcome associated with the selections. In one embodiment, a different type of game is introduced in the selection game such as a reel game. If the player wagers a predetermined amount, the gaming device provides an opportunity to spin the reels in the reel game. The symbols of the reel game, in one embodiment, represent portions of a product award which, if generated together along an active payline of the reels, is provided to the player. If less than all of the required combination of product award symbols occur on the reels, another type of award, such as a multiplier, is associated with the individual product award symbols on the payline and is applied to other awards provided to the player.

38 Claims, 13 Drawing Sheets

U.S. PATENT DOCUMENTS

| | | | | |
|---|---|---|---|---|
| 5,377,973 | A | 1/1995 | Jones et al. | |
| 5,397,125 | A | 3/1995 | Adams | |
| 5,438,518 | A * | 8/1995 | Bianco et al. | 473/407 |
| 5,511,781 | A | 4/1996 | Wood et al. | |
| 5,584,764 | A | 12/1996 | Inoue | |
| 5,611,535 | A | 3/1997 | Tiberio | |
| 5,645,485 | A | 7/1997 | Clapper, Jr. | |
| 5,722,891 | A | 3/1998 | Inoue | |
| 5,769,716 | A | 6/1998 | Saffari et al. | |
| 5,816,918 | A | 10/1998 | Kelly et al. | |
| 5,817,172 | A | 10/1998 | Yamada et al. | |
| 5,823,874 | A | 10/1998 | Adams | |
| 5,855,514 | A * | 1/1999 | Kamille | 463/17 |
| 5,910,048 | A | 6/1999 | Feinberg | |
| 5,967,893 | A | 10/1999 | Lawrence et al. | |
| 5,993,316 | A | 11/1999 | Coyle et al. | |
| 6,004,207 | A | 12/1999 | Wilson, Jr. et al. | |
| 6,012,983 | A | 1/2000 | Walker et al. | |
| 6,032,955 | A | 3/2000 | Luciano et al. | |
| 6,062,980 | A | 5/2000 | Luciano | |
| 6,102,400 | A | 8/2000 | Scott et al. | |
| 6,104,815 | A * | 8/2000 | Alcorn et al. | 380/251 |
| 6,110,041 | A | 8/2000 | Walker et al. | |
| 6,113,098 | A | 9/2000 | Adams | |
| 6,126,542 | A | 10/2000 | Fier | |
| 6,129,632 | A | 10/2000 | Luciano | |
| 6,155,925 | A * | 12/2000 | Giobbi et al. | 463/20 |
| 6,158,741 | A | 12/2000 | Koelling | |
| 6,159,095 | A * | 12/2000 | Frohm et al. | 463/19 |
| 6,159,097 | A * | 12/2000 | Gura | 463/20 |
| 6,159,098 | A | 12/2000 | Slomiany et al. | |
| 6,168,522 | B1 | 1/2001 | Walker et al. | |
| 6,168,523 | B1 * | 1/2001 | Piechowiak et al. | 463/26 |
| 6,174,233 | B1 * | 1/2001 | Sunaga et al. | 463/20 |
| 6,174,235 | B1 | 1/2001 | Walker et al. | |
| 6,186,894 | B1 * | 2/2001 | Mayeroff | 463/20 |
| 6,203,429 | B1 | 3/2001 | Demar et al. | |
| 6,210,277 | B1 | 4/2001 | Stefan | |
| 6,224,482 | B1 | 5/2001 | Bennett | |
| 6,224,483 | B1 | 5/2001 | Mayeroff | |
| 6,227,969 | B1 | 5/2001 | Yoseloff | |
| 6,227,971 | B1 | 5/2001 | Weiss | |
| 6,231,442 | B1 | 5/2001 | Mayeroff | |
| 6,231,445 | B1 | 5/2001 | Acres | |
| 6,234,897 | B1 | 5/2001 | Frohm et al. | |
| 6,238,287 | B1 | 5/2001 | Komori et al. | |
| 6,244,957 | B1 | 6/2001 | Walker et al. | |
| 6,254,482 | B1 | 7/2001 | Walker et al. | |
| 6,270,409 | B1 | 8/2001 | Shuster | |
| 6,299,165 | B1 | 10/2001 | Nagano | |
| 6,302,791 | B1 | 10/2001 | Frohm et al. | |
| 6,309,299 | B1 | 10/2001 | Weiss | |
| 6,312,331 | B1 | 11/2001 | Tamaki | |
| 6,315,662 | B1 | 11/2001 | Jorasch et al. | |
| 6,336,862 | B1 | 1/2002 | Byrne | |
| 6,358,147 | B1 | 3/2002 | Jaffe et al. | |
| 6,368,214 | B1 | 4/2002 | Luciano | |
| 6,428,412 | B1 * | 8/2002 | Anderson et al. | 463/9 |
| 6,439,995 | B1 | 8/2002 | Hughs-Baird et al. | |
| 6,450,884 | B1 | 9/2002 | Seelig et al. | |
| 6,491,584 | B2 | 12/2002 | Graham et al. | |
| 6,592,457 | B1 * | 7/2003 | Frohm et al. | 463/16 |
| 6,599,193 | B2 | 7/2003 | Baerlocher et al. | |
| 6,607,437 | B2 * | 8/2003 | Casey et al. | 463/16 |
| 6,609,969 | B1 | 8/2003 | Luciano et al. | |
| 6,609,970 | B1 | 8/2003 | Luciano, Jr. | |
| 6,634,942 | B2 | 10/2003 | Walker et al. | |
| 6,656,043 | B2 | 12/2003 | Seelig et al. | |
| 6,682,073 | B2 | 1/2004 | Bryant et al. | |
| 6,712,695 | B2 | 3/2004 | Mothwurf et al. | |
| 6,739,970 | B2 | 5/2004 | Luciano | |
| 6,764,396 | B2 | 7/2004 | Seelig et al. | |
| 7,175,523 | B2 * | 2/2007 | Gilmore et al. | 463/16 |
| 2001/0053712 | A1 * | 12/2001 | Yoseloff et al. | 463/1 |
| 2002/0137559 | A1 | 9/2002 | Baerlocher | |
| 2002/0187827 | A1 | 12/2002 | Blankstein | |
| 2003/0006931 | A1 * | 1/2003 | Mages | 342/357.06 |
| 2003/0027623 | A1 | 2/2003 | Rose | |
| 2003/0054873 | A1 | 3/2003 | Peterson | |
| 2003/0060266 | A1 | 3/2003 | Baerlocher | |
| 2003/0153383 | A1 | 8/2003 | Baerlocher et al. | |
| 2008/0214292 | A1 * | 9/2008 | Bryant et al. | 463/25 |

OTHER PUBLICATIONS

Black Swan Wagering Description and Paytable written by IGT, published prior to 2001.
Jackpot Party Advertisements and Articles written by WMS Gaming, Inc., published Mar., 1998 (16 pages).
Jackpot Party Video 9-Line Advertisement written by WMS Gaming, Inc., published prior to Sep. 11, 2003.
Jackpot Party How to Play website page http://www.wmsgamig.com/products/video/vipp/howto.html, printed on Feb. 7, 2001.
Jackpot Party Advertisement on website page http://www.wmsgaming.com/products/slot/jpp/index.html, printed on Mar. 21, 2001.
Jazzy Jackpots Article written by Strictly Slots, published Mar. 2001.
Neon Nights Advertisement written by IGT, published in 2000.
We Make Gaming Fun! Advertisement written by WMS Gaming Inc., published prior to Sep. 11, 2003.
Five Card Instant Bingo Advertisement written by IGT, published in 2000.
Instant Bingo Video Slots Advertisement written by IGT, published in 2002.
Slots 2003 Article written by Melissa Raimondi, published in Jan. 2003.
Super Spin Sizzling 7 Slots Advertisement written by IGT, published in 2002.
Wheel of Fortune Slots Advertisement written by IGT, published in 2002.
PCT International Search Report for International Application No. PCT/US04/28858 with a mail date of Jul. 3, 2007, 3 pages.
PCT Written Opinion of the International Searching Authority for International Application No. PCT/US04/28858 with a mail date of Jul. 3, 2007, 5 pages.

* cited by examiner

FIG. 3

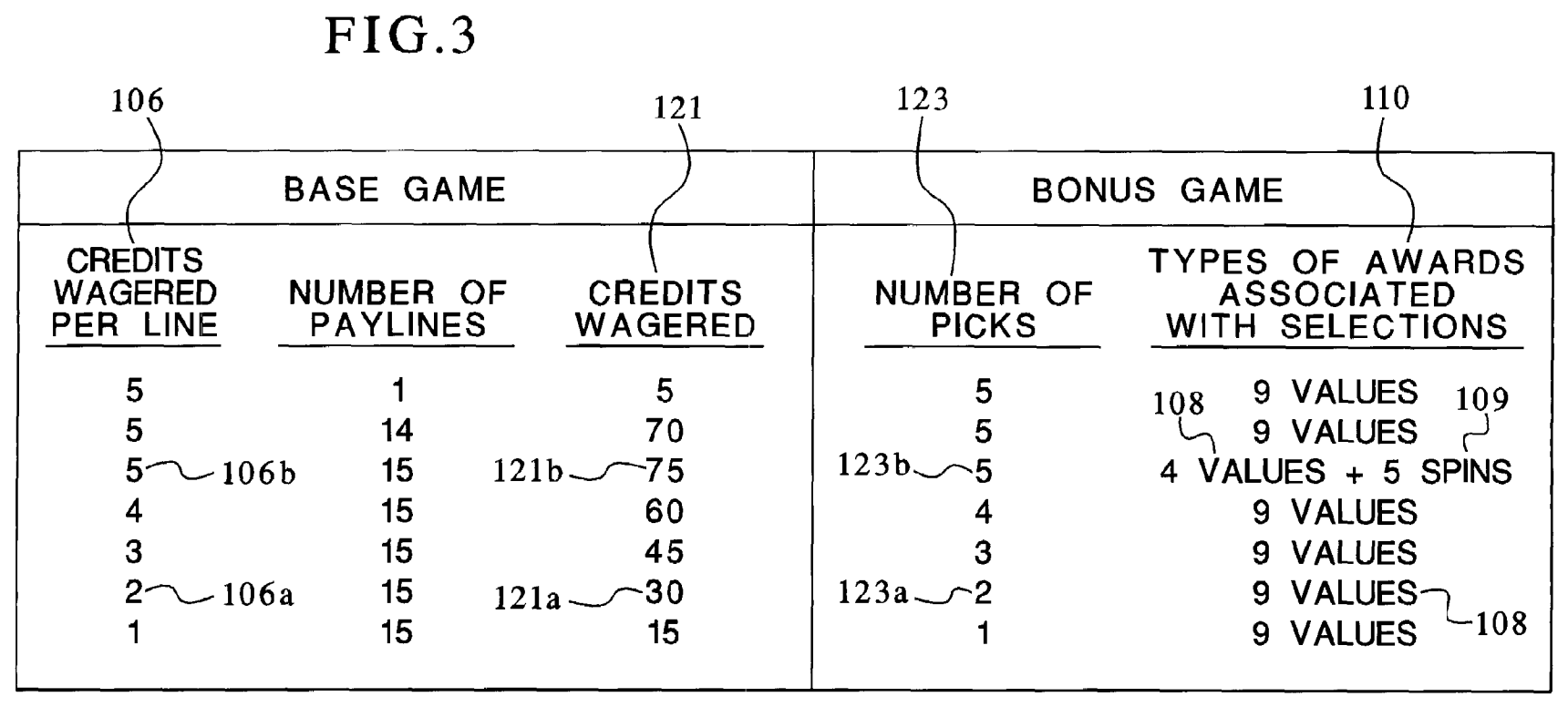

| BASE GAME | | | BONUS GAME | |
|---|---|---|---|---|
| CREDITS WAGERED PER LINE | NUMBER OF PAYLINES | CREDITS WAGERED | NUMBER OF PICKS | TYPES OF AWARDS ASSOCIATED WITH SELECTIONS |
| 5 | 1 | 5 | 5 | 9 VALUES |
| 5 | 14 | 70 | 5 | 9 VALUES |
| 5 | 15 | 75 | 5 | 4 VALUES + 5 SPINS |
| 4 | 15 | 60 | 4 | 9 VALUES |
| 3 | 15 | 45 | 3 | 9 VALUES |
| 2 | 15 | 30 | 2 | 9 VALUES |
| 1 | 15 | 15 | 1 | 9 VALUES |

GAMING DEVICE HAVING SELECTION PICKS AND SELECTION OUTCOMES DETERMINED BASED ON A WAGER

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a primary or secondary game which includes a number of picks of selections and the selection outcomes determined based on a wager.

BACKGROUND OF THE INVENTION

Gaming machine manufacturers constantly strive to produce gaming machines that maximize enjoyment and excitement for players by incorporating familiar features in various ways in the games. Known gaming devices include triggering events which occur during the play of the base game of the gaming device. The triggering event temporarily stalls or halts the base game play and enables the player to enter a second, different type of game, which is the bonus game. The player plays one type of game in the bonus game, likely receives an award in the bonus game, and returns to the base game. There is, therefore, a need to combine in unique ways different types of games employed in different gaming machines into one game.

An example of a well-known type of game is a selection game. A typical selection game used in a secondary or bonus game prompts and enables the player to pick one or more selections from a group of masked selections. When the player picks one or more of the assorted selections, the gaming device provides the player the awards associated with the selections picked by the player and the game ends.

Reel games are also well-known types of games. It is well known that a plurality of reels can be employed in a bonus game as well as a base game. Reels in gaming devices are known to have a variety of different types of symbols, indicia or characters displayed on the reels. Awards are typically associated with one or more symbols, and one or more combinations of symbols.

Gaming device manufacturers have also made games where the maximum wager in the base game influences an outcome in a bonus game. An example of a method in which a wager in the base game is able to affect an outcome in the bonus game is disclosed in U.S. Pat. No. 6,186,894 in which in one embodiment the number of chances provided to the player to play the secondary event game is based on the number of paylines that the player has played on the main game or by the number of credits wagered on each payline.

There is a continuing need to provide new and different games for wagering gaming machines.

SUMMARY OF THE INVENTION

The present invention relates generally to a gaming device having a primary or base game and a secondary or bonus game wherein certain events and outcomes in the bonus game are based on the wager in the base game.

In one embodiment of the present invention, the gaming device provides at least two different ways of simultaneously changing the bonus game based on the wager in the base game. In one embodiment, the gaming device includes a primary game operable upon a wager by a player and a secondary game. At least one primary award is adapted to be provided to the player in the primary game. The secondary game includes at least two different features or types of features or functions which are changed if the player makes a designated wager in the primary game. The secondary game includes a plurality of different secondary game awards adapted to be provided to the player based on the changed types of features or functions. It should be appreciated that the changeable features or types of features or functions of a secondary game can be any suitable feature or function in the game if the player makes a designated wager in the primary game.

In one embodiment which includes player-selectable selections, the wager made by a player in the base game determines the number of picks of the selections provided to the player as well as the outcomes associated with at least one and preferably a plurality of the selections.

In one embodiment of the present invention, the gaming device displays a plurality of masked selections. An outcome or award is associated with each selection. The gaming device provides the player a number of picks of the selections based on the credits bet or wagered in the base game. In one embodiment, the number of picks provided to the player of the selections is based on the number of credits wagered per payline of the base game. If, for example, the player bets two credits per payline which, in a fifteen-line game, would be thirty credits, the player receives two picks of the selections in the bonus game. If the player bets the maximum amount per payline in by the base game, the player receives the maximum number of picks of the selections. This correlation can be linear or non-linear.

In one embodiment, the bonus game includes a secondary display device which includes a symbol generator including one or more wheels, die, reels, set of reels or any other suitable device adapted to display generated symbols. In one embodiment, the symbol generator is a plurality of reels which include a plurality of symbols on the reels. The bonus game in one embodiment includes a plurality of reels with symbol combinations resulting in more than one type of award or award component in addition to the plurality of selections described above. The number of picks of the selections and possible activations of the reels which are associated with the selections are both based on the wager made by the player in the base game.

If in one embodiment the player bets or wagers less than the maximum amount for the base game, the awards associated with the selections provided to the player are limited to values and do not include activation of the reels of the bonus game. In one embodiment, if the player bets the maximum amount in the base game, the outcomes or awards associated with the selections are different from the outcomes or awards associated with the selections if the player wagered less than the maximum amount predetermined by the base game. In one embodiment, the selections provided to the player include one or more activations or spins of the set of reels only if the player bets the maximum amount in the base game. In one embodiment, if the player picks a selection having an associated spin of the reels, the game or the player is able to spin the reels on the secondary display device to achieve another outcome or win another award or another type of award associated with different types of symbols on the reels.

In one embodiment, the symbols on the reels represent parts or portions of an actual physical object such as any suitable merchandise or product able to be provided to the player as a product award. In one embodiment, a plurality of symbols or a symbol combination must be generated to obtain the product award. Each symbol of the combination is displayed on one reel as a product award symbol. The reels move independently. A product award is provided to the player if the product award symbols line up along the same payline on the reels.

In one embodiment of the present invention, if the gaming device generates less than all of the product award symbols along a payline, the player is provided another type of award associated with the symbols. In one embodiment, the product award symbols, when not generated with the other product award symbols along the same payline, include a modifier of the award to be applied in the game, or, alternatively, in a later game. It should be appreciated that the reels may also include other symbols representing other types of awards such as values.

It is therefore an advantage of the present invention to provide a gaming device which combines different types of games in a single game.

A further advantage of the present invention includes an additional chance at enhancing an award based on the maximum wager in a base game.

Additional features and advantages of the present invention are described in, and will be apparent from, the following Detailed Description of the Invention and the figures.

BRIEF DESCRIPTION OF THE FIGURES

FIG. 3 is a table of an example of one embodiment of the present invention illustrating how the wager in the base game affects the outcome of the bonus game simultaneously in a plurality of different manners.

DETAILED DESCRIPTION OF THE INVENTION

Gaming Device and Electronics

Figure 1A:
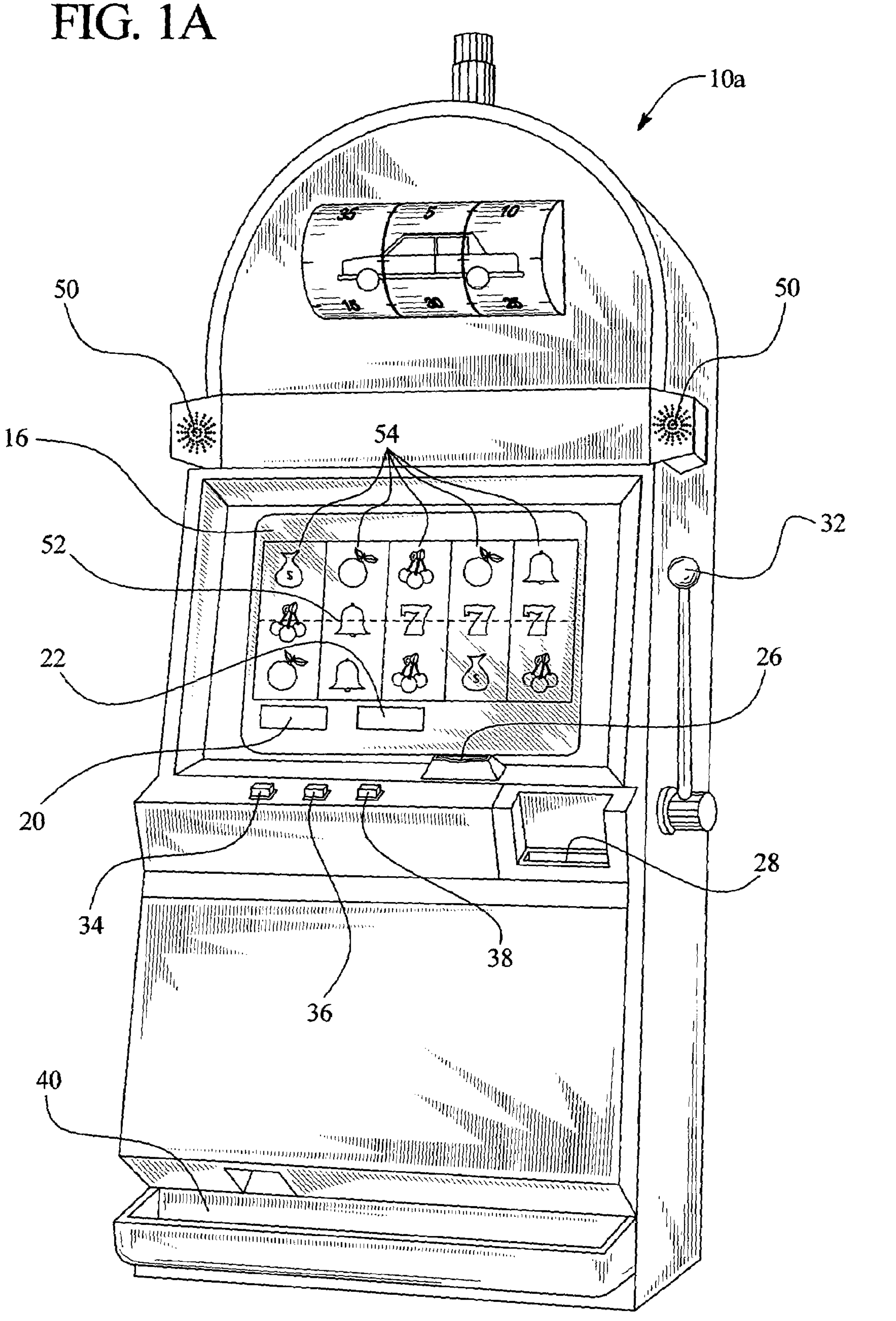
FIG. 1A is a front prospective view of one embodiment of the gaming device of the present invention.
Figure 1B:
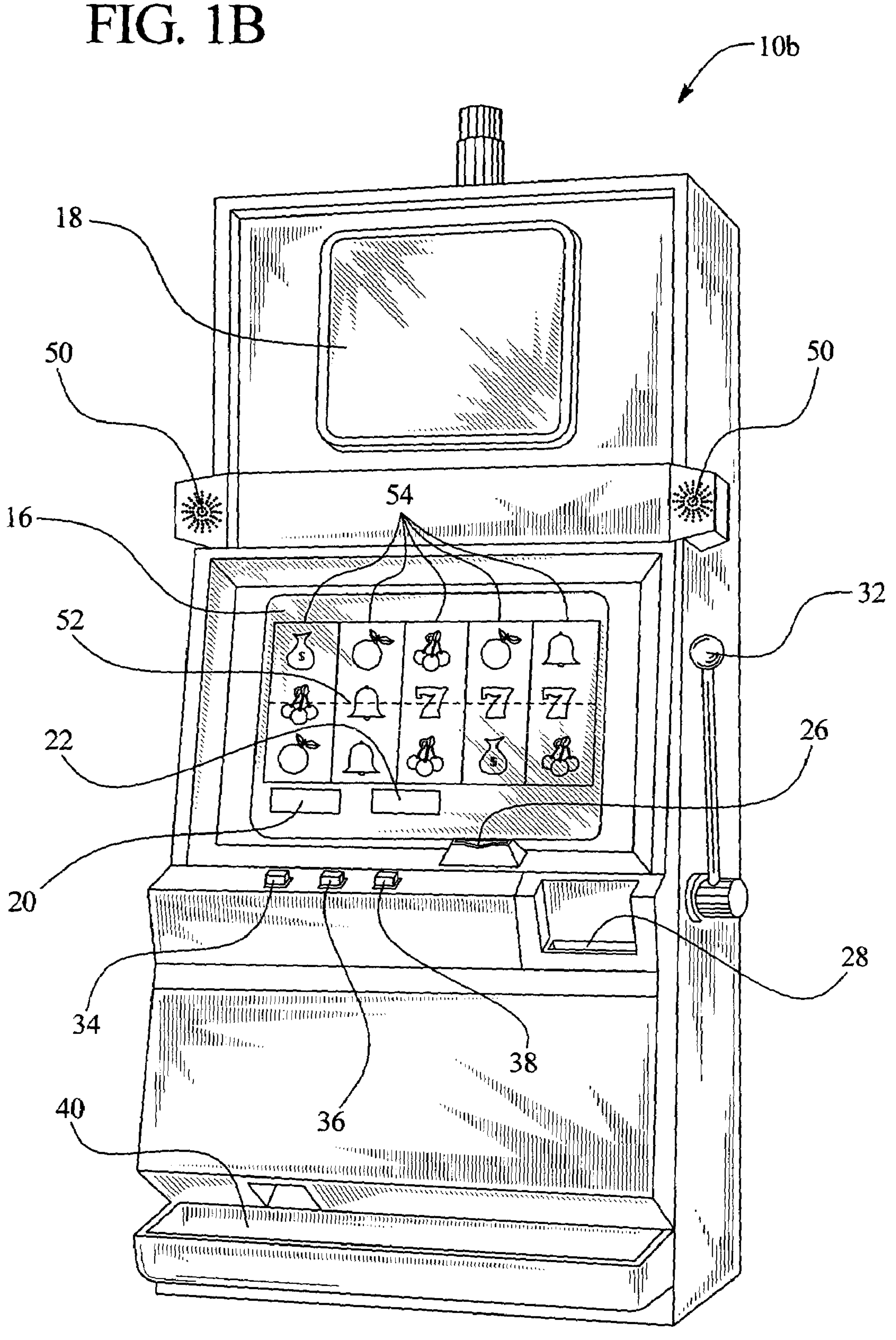
FIG. 1B is a front prospective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
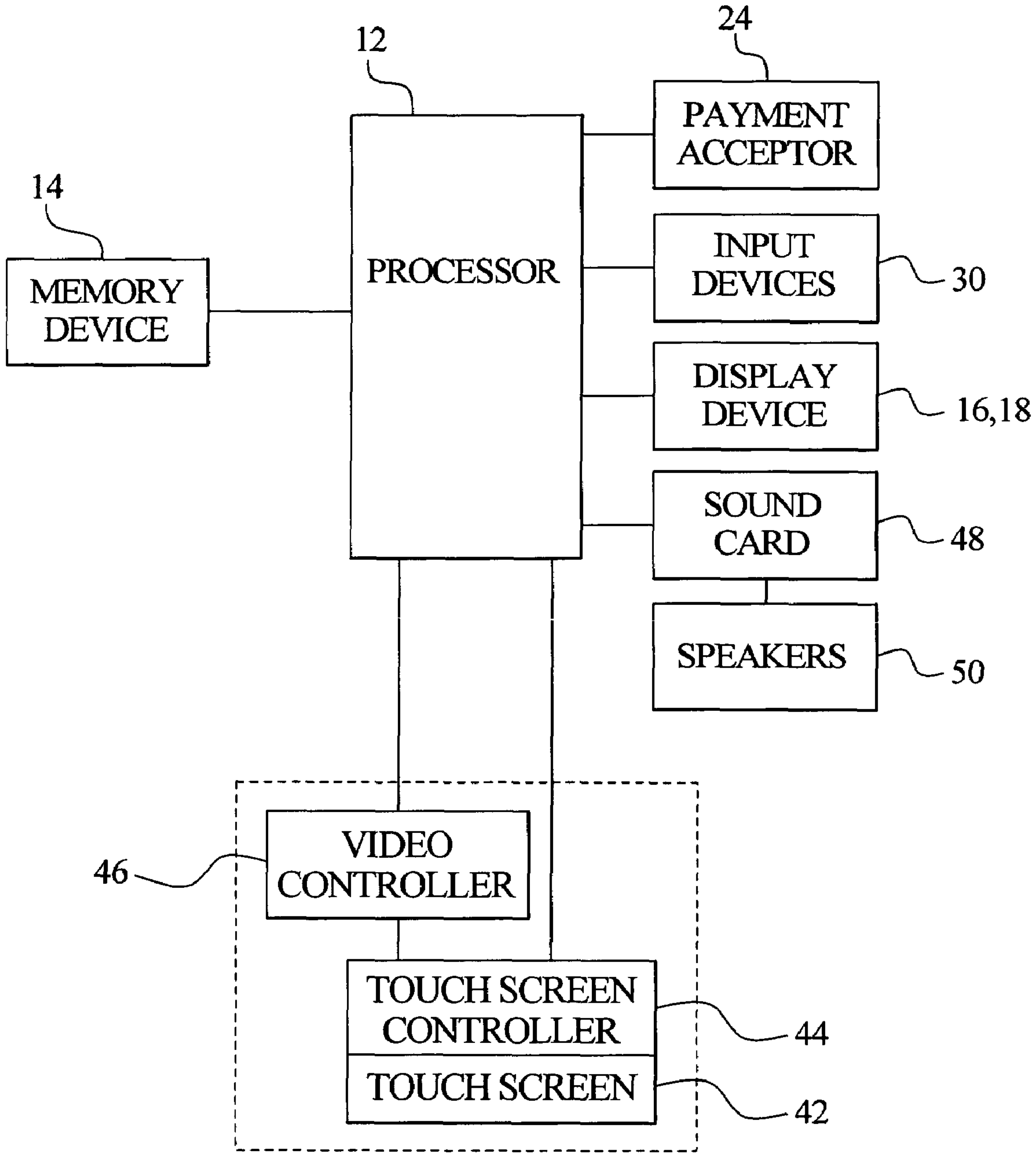
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, the plurality of simulated video reels 54 are displayed on one or more of the display devices as described above. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active payline or otherwise occur in a winning pattern.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
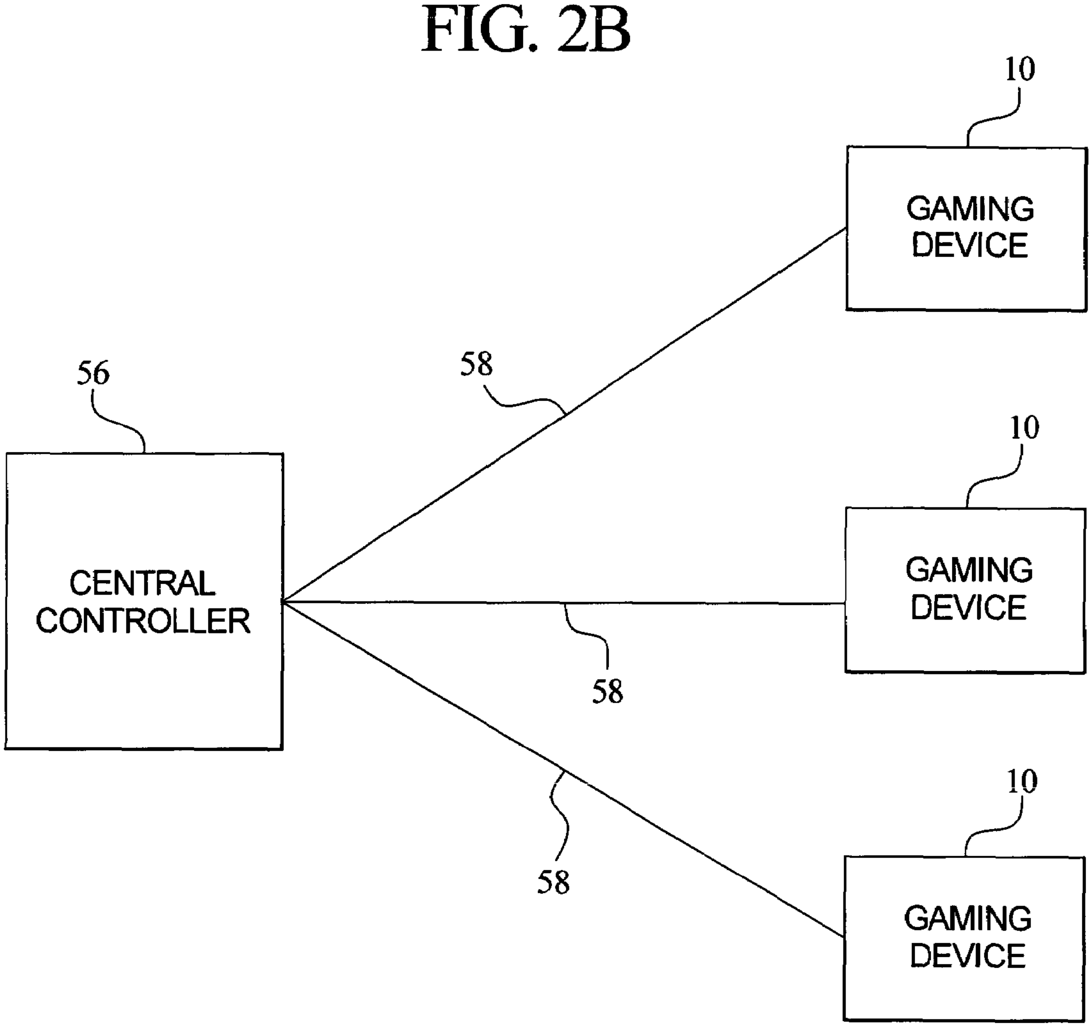
FIG. 2B is a schematic block diagram of the central determination embodiment of the gaming device of the present invention.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Combined Selection and Reel Games

Referring now to FIG. 3, in one embodiment of the present invention, the wager made by the player in the base game simultaneously affects the outcome of the bonus game in a plurality of different manners. Specifically, the table in FIG. 3 illustrates an example of one embodiment of the present invention which includes changes to the different features or types of features in the bonus game such as the number of picks of selections and the types of awards associated with those selections based on the credits wagered per payline in the base game. If, for example, the player wagers two credits per payline 106*a* of a maximum number of fifteen paylines in the base game, the total credits wagered in the base game 121*a* is thirty credits. If the bonus game is triggered, the gaming device provides the player two picks 123*a* of the selections in the bonus game based on the two credits wagered per payline 106*a* in the base game.

In one embodiment, if the player does not wager the maximum amount, the types of awards associated with the selections 110 are limited to values 108. In the illustrated embodiment of FIG. 3, the maximum wager is five credits per payline of fifteen paylines or seventy-five credits. Wagering less than five credits per payline and/or activating fewer than all fifteen paylines, therefore, associates only values with the selections.

If the player wagers the maximum amount per payline 106*b* and activates the maximum number of paylines in the base game, the player receives the maximum number of picks 123*b* of the selections, and the player is able to select at least two different types of awards associated with the selections 110. In the embodiment illustrated in FIG. 3, the maximum wager requires a wager of five credits per payline of fifteen paylines or seventy-five credits 121*b* which provides the player five picks of the selections, one pick per credit wagered per payline. In addition, the maximum wager associates as outcomes of the selections both credit values 108 and spins of the reels 109 in a reel bonus game where the player can enhance the award earned in the selection game and possibly, in one embodiment, win an additional award associated with the reel game. It should be appreciated that any suitable combination of credits wagered in the base game and changes to the features of the bonus game can be employed by the implementer of the game. It should also be appreciated that other types of games can be combined in the bonus game and features of those games enhanced based on the credits wagered in the base game.

Figure 4A:
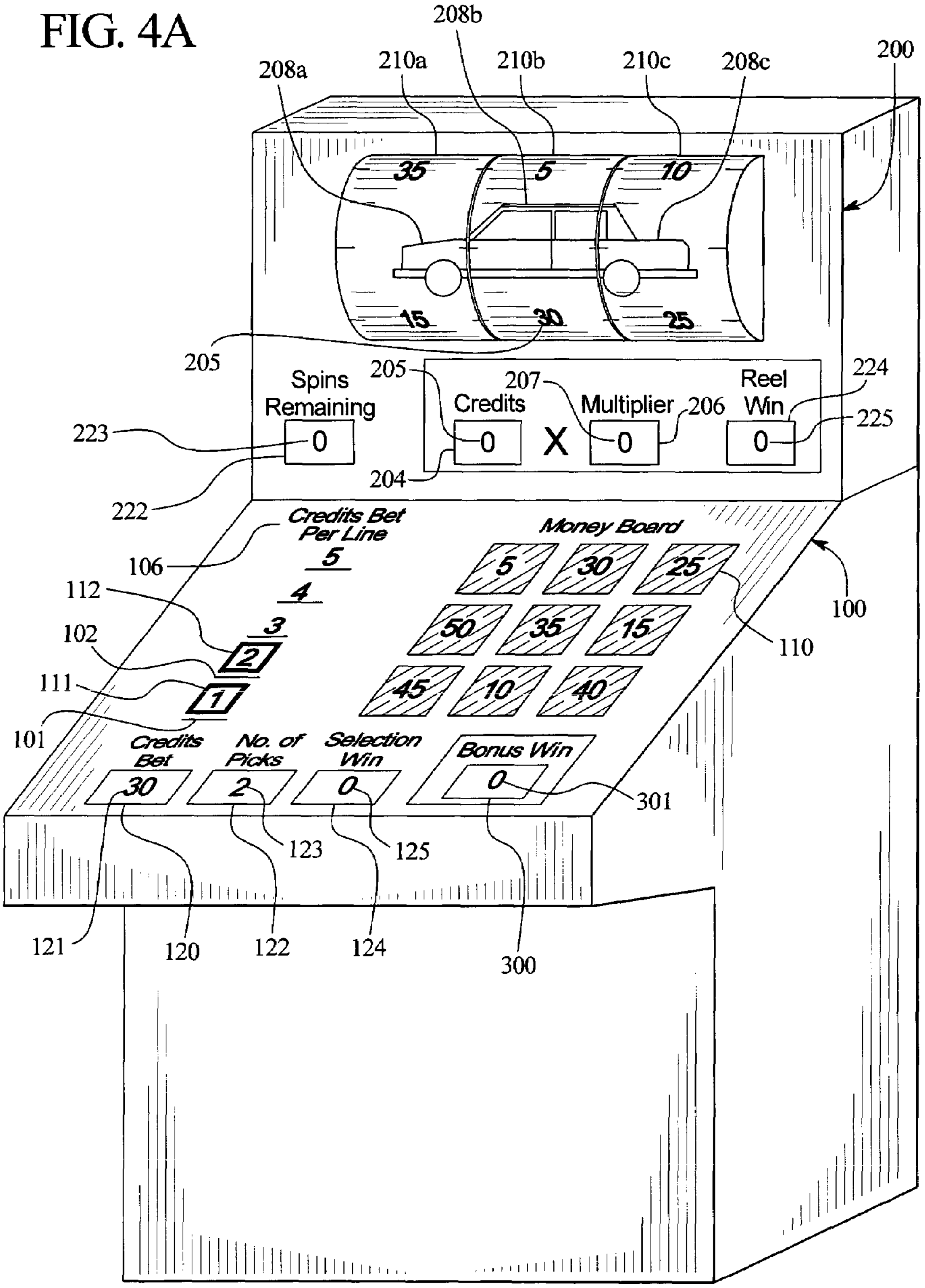
FIGS. 4A, 4B and 4C are enlarged front elevation views of a slant top display device illustrating one embodiment of the present invention wherein the player wagers less than the maximum amount in the base game.
Figure 4B:
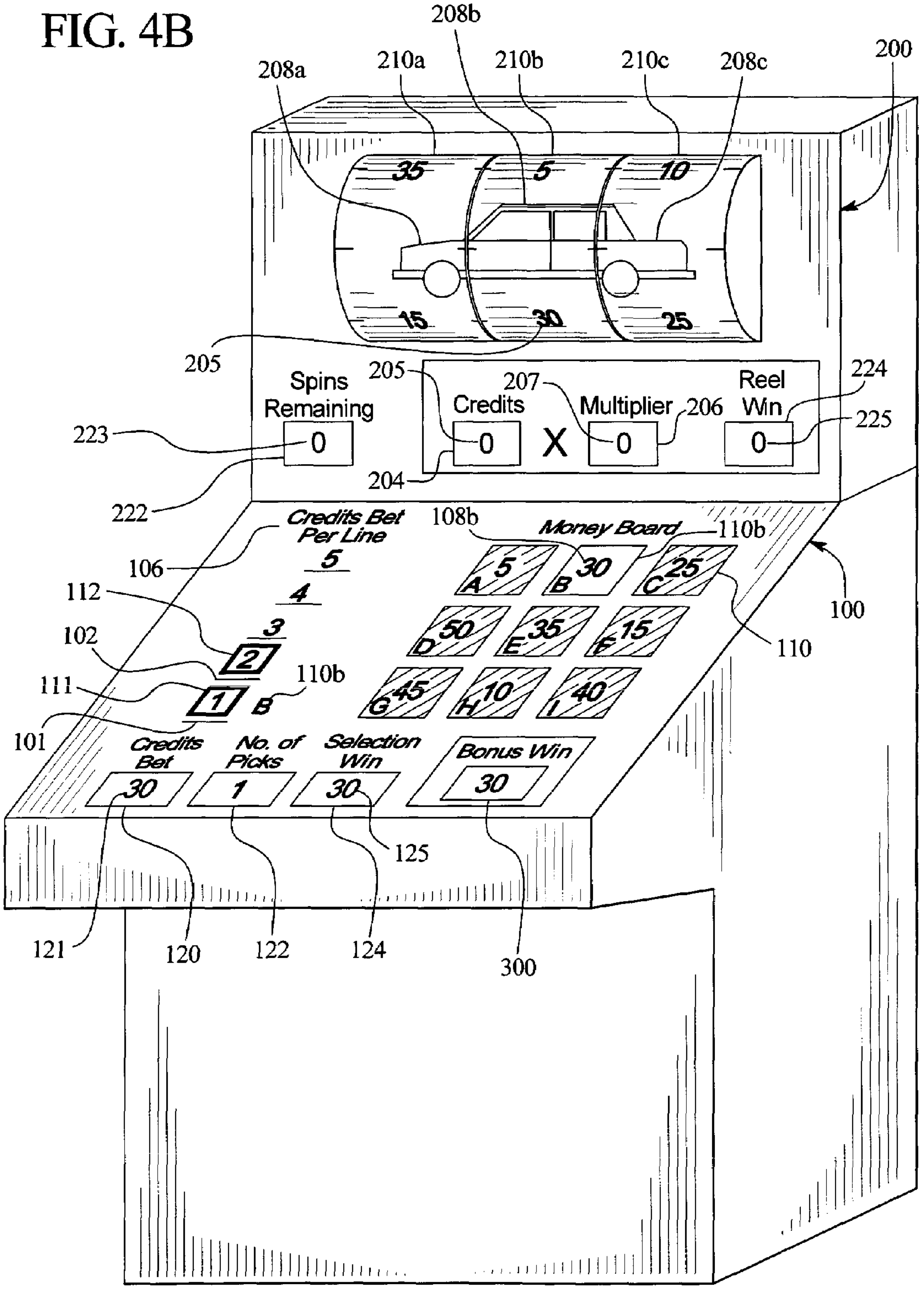
Figure 4C:
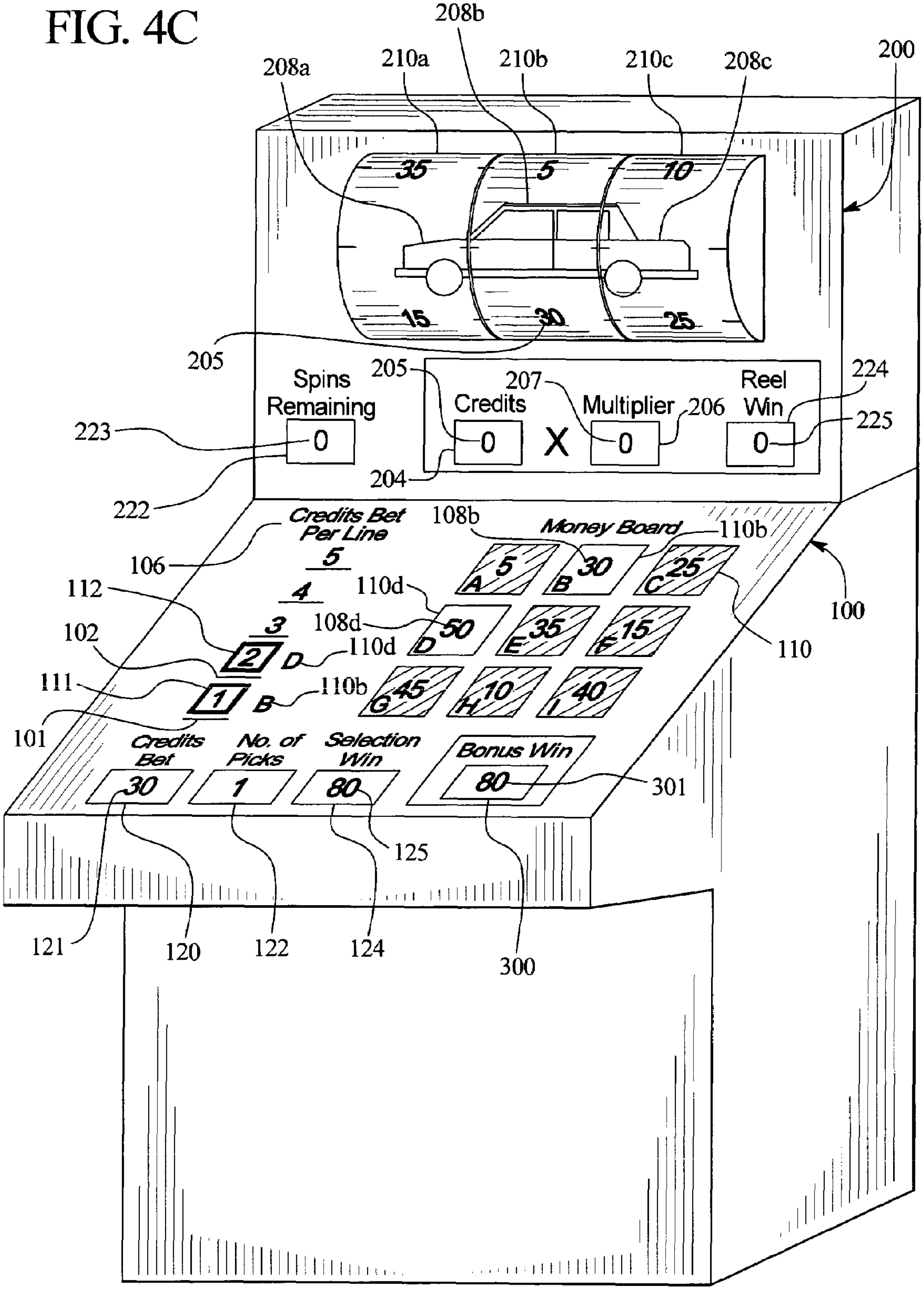

Referring now to FIGS. 4A, 4B, and 4C, in one embodiment of the present invention, a gaming device provides two types of game events, sequences or games combined in a bonus game. It should be appreciated that any suitable number of types of games can be combined in one bonus game. In one embodiment, the bonus game includes a selection game and a reel game displayed separately on two different portions of the gaming device. The selections game is displayed on a video screen 100 and the reels game is displayed on the top box 200 of the gaming device as illustrated in FIGS. 4A to 4C and FIGS. 5A to 5E.

In one embodiment, the base game is a fifteen-line video slot game wherein the player is enabled to wager up to five credits per payline. The bonus game is initiated by a triggering event in the base game. In the preferred embodiment, the base game includes a reel game that triggers the bonus game by generating a predetermined combination of symbols on the reels in the base game.

In one embodiment, after the bonus game is triggered, the player is presented with a plurality of selections which includes nine player-selectable selections 110*a* to 110*i*. The selections 110*a* to 110*i* include an outcome or award 108*a* to 108*l* respectively associated with each selection. It should be appreciated that the outcomes or awards can include credit values, modifiers such as a multiplier, a free pick, or any other suitable outcome or award. In the preferred embodiment, the outcomes or awards associated with each selection remain masked or hidden from the player until the player picks the selection.

The selection display, in one embodiment, also includes a plurality of positions 111, 112, 113, 114 and 115 which are associated with the number of credits bet per payline 101, 102, 103, 104 and 105 in the base game. For instance if the player bet one credit per payline 101 in the base game, only the position 111 corresponding to one credit wagered per payline will be highlighted or otherwise indicated. As illustrated in FIG. 4A, because the player bet two credits per payline in the base game 102, both positions 111 and 112 corresponding to one and two credits wagered per payline 101 and 102, respectively, are highlighted indicating the number of picks provided to the player in the bonus game. Similarly, it should be appreciated that if the player were to have bet three credits per payline 103, four credits per payline 104, or five credits per payline 105, the corresponding positions 113, 114 and 115 would be highlighted. When the player picks a selection, the selection or result of the selection is placed in the position beginning with the one credit wagered per payline position 111.

The selection display 100 includes a display 120 of the number of credits 121 wagered or bet in the base game. The display 100 also includes a display 122 of the number of picks 123 corresponding to the amount wagered in the base game. In one embodiment, the number of credits wagered per payline in the base game 106 corresponds to the number of picks 123 provided to the player of the selections on the display 100. The selection win display 124 indicates the accumulated award values 125 associated with the selections 110*a* to 110*i* picked by the player in the selection portion of the bonus game. The bonus win display 300 includes the total accumulated award 301 provided to the player in both the selection game and the reel game.

The second portion of the display of the bonus game includes, in one embodiment, three standard reels 210*a*, 210*b* and 210*c* in the top box 200 of the gaming device. The symbols on the reels include value symbols 205 and portions 208*a*, 208*b* and 208*c* of at least one product award symbol 208. In one embodiment, each product award symbol 208, 208*b* and 208*c* includes or masks another type of award such as a modifier 207. The reel display 200 also includes a display 222 indicating the number of spins remaining 223 in the reel game. The number of spins remaining 223 is based on the selections 110 picked by the player in the selection game. The additional components of the reel display include a credits display 204 which displays the number of credits 205 provided to the player based on the values 205 displayed on a payline on the reels. The multiplier display 206 indicates any multipliers 207 provided to the player which are associated with different symbols on the reels such as the product award symbol as discussed above. The reel win display 224 indicates the total award 225 provided to the player in the reel portion of the bonus game which is based on the number of credits 205 and any multipliers 207 applied to the number of credits 205 provided to the player.

In FIG. 4A, in one embodiment, the player bets or wagers two credits per payline which, according to FIG. 3, for fifteen paylines, is equal to thirty credits wagered in the base game. If a triggering event occurs in the base game which initiates the bonus game, the player receives two picks of the selections in the bonus game based on the amount wagered in the base game. In the embodiment illustrated in FIG. 4A, the player is provided a choice of nine masked selections and has two picks of those selections. As indicated, the number one and number two positions 111 and 112 corresponding to the number of credits bet per payline and the number of picks provided to the player are highlighted.

In FIG. 4B the player picks selection 110*b* which reveals an award 108*b* of thirty credits associated with the selection 110*b* and is placed in the position 111 corresponding to one credit bet per payline 101. The selection win display 124 is updated to include the award 108*b* provided to the player based on the player selection.

Similarly, in FIG. 4C, the player makes the second of two selections and picks selection 110*d* which reveals an award 108*d* of fifty credits. The selection is moved to the two bets per payline position 112 indicating the selection was picked. The selection win display 124 is updated to add fifty credits to the thirty credits in the previous pick to provide a total award 125 of eighty credits. The bonus win display 300 also indicates the number of credits 301 associated with the selections picked by the player. In one embodiment, the bonus game ends at this point because the player wagered less than a designated amount such as the maximum amount in the base game, and the reel game is not played.

Referring now to FIGS. 5A, 5B, 5C, 5D and 5E, in one embodiment of the present invention, if the player bets or wagers in the base game the designated amount such as the maximum amount predetermined by the game, the player is provided a different set of outcomes associated with the displayed selections. In one embodiment, the outcomes associated with the selections in the bonus game include transfers to or activations of a secondary display device where, in one embodiment, symbols are generated to provide another award or type of award. In one embodiment, the selections include reel spin icons or symbols which allow the player to spin the reels of a reel game and further enhance any award provided to the player in the selection portion of the bonus game.

Figure 5A:
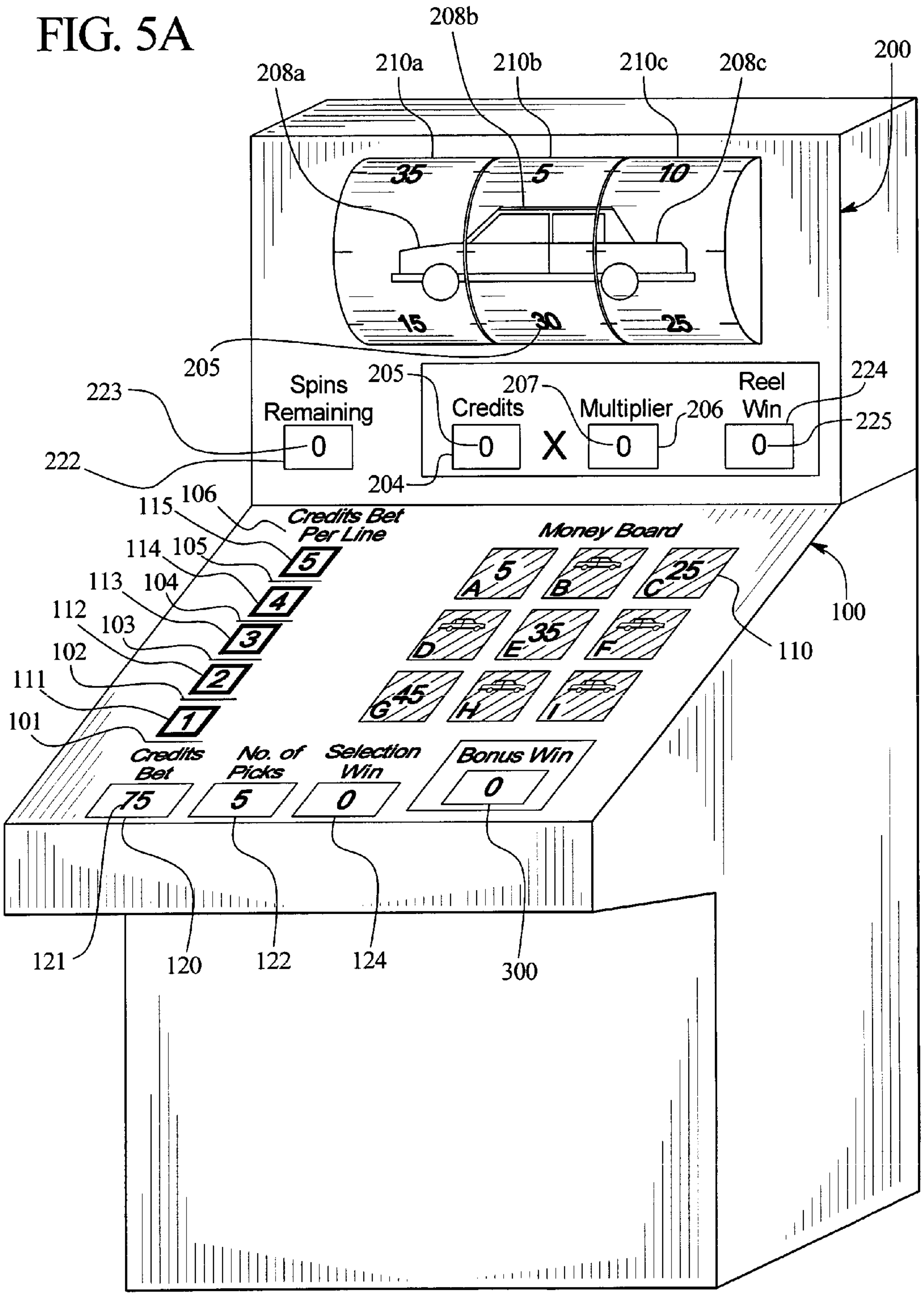
FIGS. 5A, 5B, 5C, 5D and 5E are enlarged front views of a slant top display device illustrating one embodiment of the present invention wherein the player wagers the maximum amount in the base game.

In FIG. 5A, the player wagers five credits per payline in the base game which, in the illustrated embodiment, is predetermined by the game to be the maximum wager. There are fifteen paylines in the base game and, therefore, the total number of credits bet 121 is seventy-five credits as indicated by the credits bet display 120 in the bonus game display. If the bonus game is triggered by a triggering event in the base game, the gaming device transitions the player to the selection portion of the bonus game wherein the credits bet per payline 106 is indicated by the bets per payline positions 111, 112, 113, 114 and 115. Because the player has bet five credits per payline, all five positions 111, 112, 113, 114 and 115 are highlighted in the bonus game display. As discussed above, in the illustrated embodiment, the player receives one pick per credit bet per payline in the base game; therefore, the player has five picks 123 of the nine selections 110 in the selection display 100.

Figure 5B:
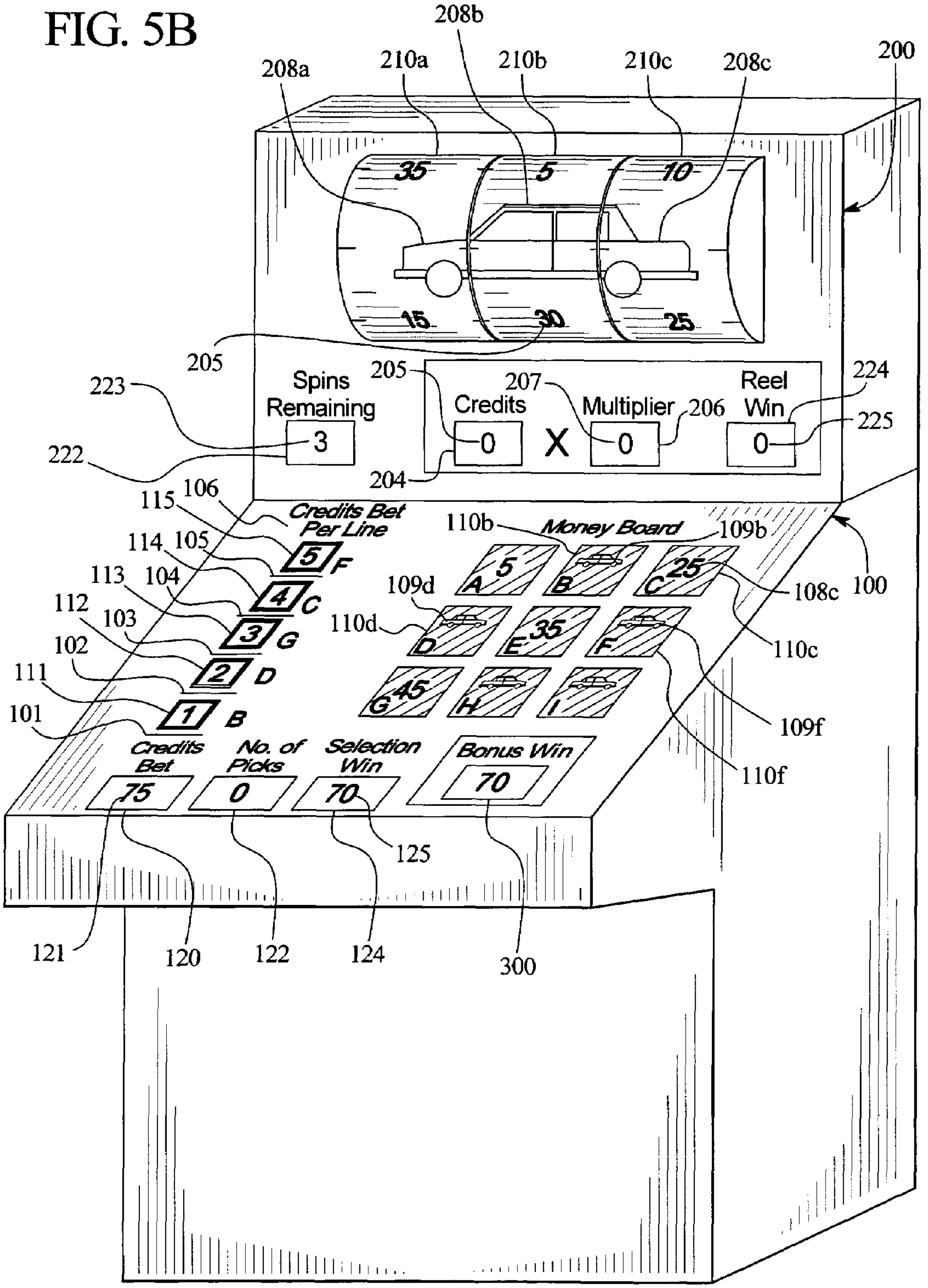

In FIG. 5B the player has made all five selections and has accumulated a selection win 125 of seventy credits which includes the twenty-five credits 108*c* associated with selection 110*c* and the forty-five credits 108*g* associated with selection 110*g* yielding a total selection win 125 of seventy credits. In addition to the credit values 108 selected by the player, the player has also picked selections 110*b*, 110*d* and 110*f*, which provide three reel spin symbols 109*b*, 109*d* and 109*f* each indicating one spin of the reels in the reel bonus game. Therefore, the player is provided three spins of the reels in the reel bonus game indicated by the spins remaining display 222 in the reel game display 200. In one embodiment, the player is enabled to accumulate any activation outcomes associated with the picked selections before the different type of game is activated. Therefore, once the player has picked the number of selections provided to the player based on the player's wager in the base game, the player is transferred to the reel game where the player spins the reels to earn or enhance the award provided in the selection game. Alternatively, the different type of game is activated after the player picks each selection which includes such an outcome. In the gaming device of the illustrated embodiment, the reel game can transfer the player to the reel game each time the player picks a reel spin symbol in the selection game and return the player to the selection game to complete the number of picks provided to the player based on the player's wager in the base game.

Figure 5C:
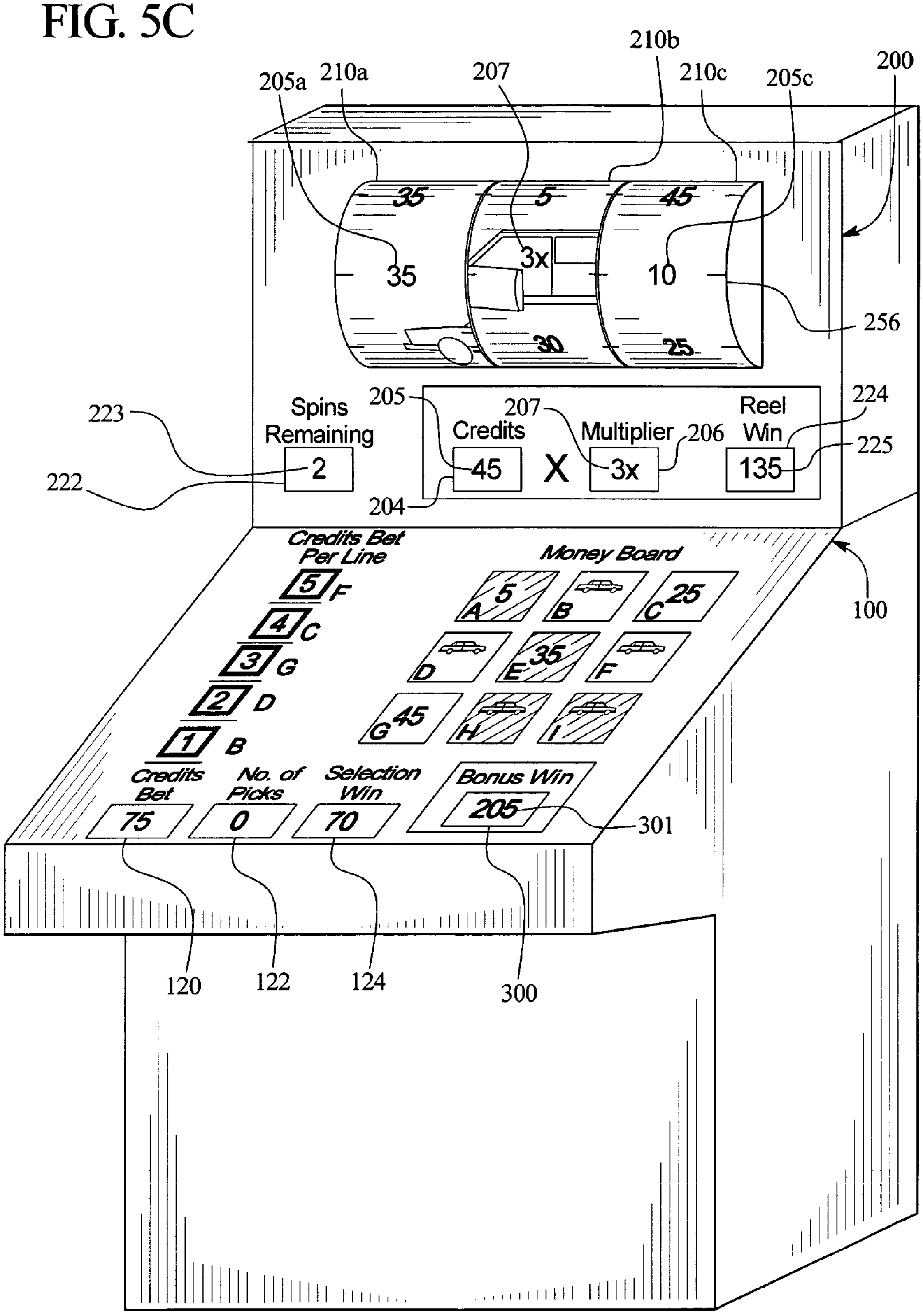

In FIG. 5C the reels 210*a*, 210*b* and 210*c* are spun once, and the spins remaining display 222 indicates two spins 223 remaining. In the initial spin of the reels, the player is provided the values 205 occurring on the payline 256 of the reels 210*a* and 210*c* which include thirty-five credits 205*a* on the first reel 210*a* and ten credits 205*c* on reel 210*c*.

In one embodiment of the present invention, at least one jackpot or product award symbol is displayed on each of the reels. Jackpot award symbols, in one embodiment, represent parts or portions of the total jackpot award. Similarly, product award symbols, in one embodiment, represent parts or portions of a physical object such as a product or merchandise. The jackpot or product is provided to the player as an award if all of the jackpot or product award symbols representing all the portions of the jackpot or merchandise are displayed on the same active payline associated with the reels. In the illustrated embodiment, the product award is a new car. In one embodiment, the combination of all displayed product award symbols depicts a car, each product award symbol depicting one of three portions of the car including the front, the middle and the rear of the car. The portions of the car associated with each product award symbol are, in one embodiment, displayed on three different reels. It should be appreciated that product awards may also include other awards of value including other physical objects such as a boats, RVs, homes, jewelry, etc., experiences such as travel, cruises, vacations, etc. or investments such as stocks.

In one embodiment, if only one portion of the jackpot or product award is displayed on the payline of the reels, the jackpot or product award symbol can also represent another type of award such as a modifier. In one embodiment illustrated in FIG. 5C, the type of award associated with the product award symbol 208 is a multiplier 207 which is applied to any value 205 displayed on the payline 256 of the reels in that spin of the reels. In FIG. 5C the product award portion represents a 3× multiplier 207 which is applied to the forty-five credits generated along the same payline and provided to the player. The reel win display 224 indicates a total award 225 from the first spin of the reels to be one hundred thirty five credits (forty-five credits× the 3× multiplier). The bonus win display 300 is updated adding the reel win 225 of one hundred thirty five credits to the selection win 125 of seventy credits to produce a total bonus win 301 of two hundred five credits.

Figure 5D:
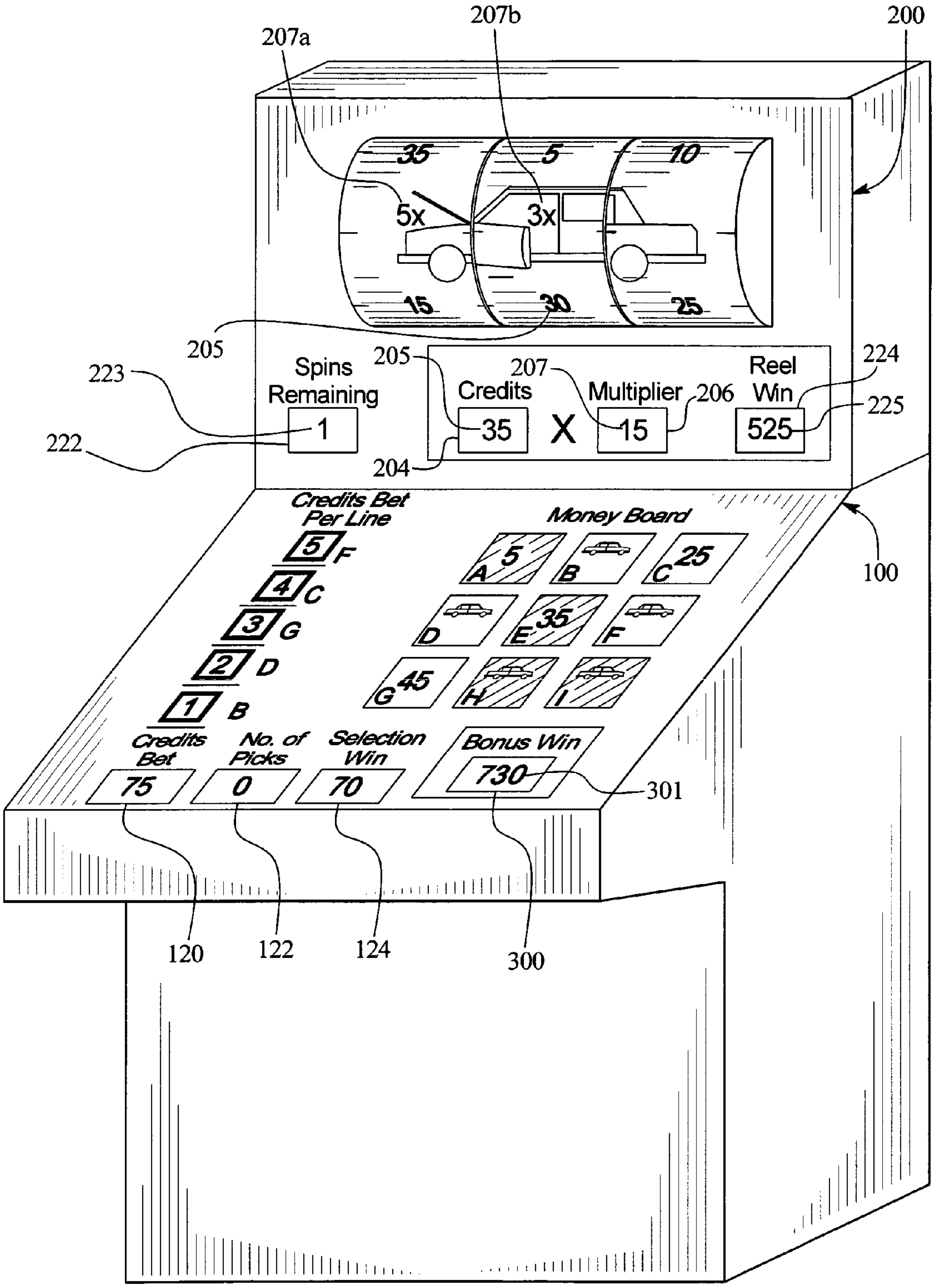

In FIG. 5D the reels spin a second time and have two product award symbols representing two of the three portions of the product award aligned on the payline of the reels. In the illustrated embodiment in FIG. 5D each portion of the product award reveals a multiplier 207 to be applied to any credits earned or provided to the player on the same payline. In FIG. 5D the player is provided thirty-five credits and a 5× multiplier and a 3× multiplier. In one embodiment, the multipliers are multiplied by one another to provide the player a 15× multiplier (5××3×) which is multiplied by the credits 205 of thirty-five credits to provide a reel win 225 of five hundred twenty five credits indicated by the reel win display 224. The bonus win display 300 is then updated to include the reel win 225 provided to the player on the second spin of the reels adding five hundred twenty five credits to the two hundred five credits from the first spin of the reels to produce a total bonus win 301 of seven hundred thirty credits.

Figure 5E:
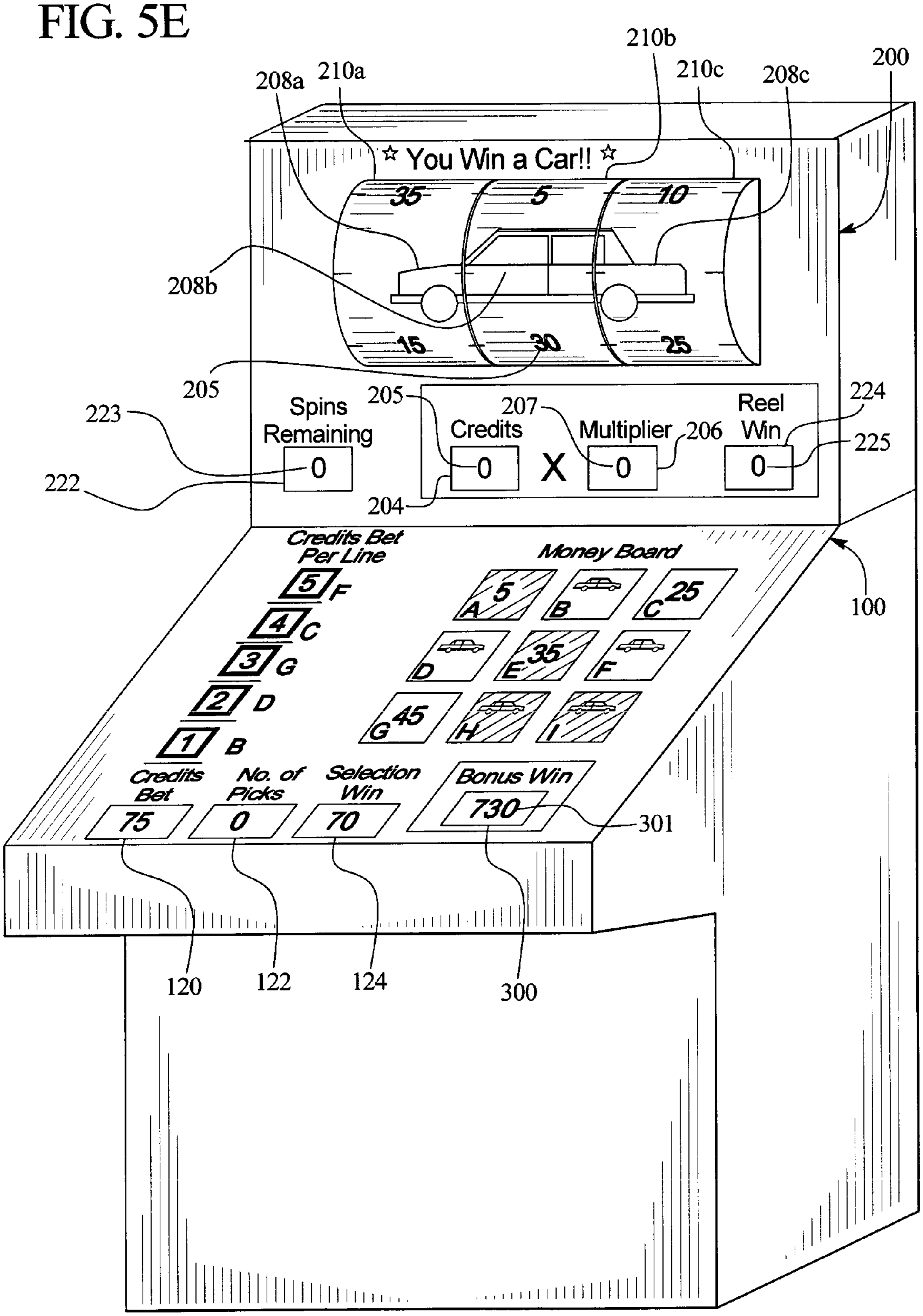

In FIG. 5E all three portions 208*a*, 208*b* and 208*c* of the product award 208 are generated along the same payline 256 of the reels 210*a*, 210*b* and 210*c* indicating that the game will provide the product award, the new car, represented by the aligned symbols 208*a*, 208*b* and 208*c*. In the embodiment in FIG. 5E, the player has won a new car 208 and a bonus win 301 of seven hundred thirty credits. Although, in the illustrated embodiment of FIG. 5E, the spins remaining display 222 indicates that the player has no spins 223 available, in one embodiment, if the player had any spins remaining, the player continues to be eligible to win at least another award if winning spins are generated on the reels. It should be appreciated, then, that a player can win multiple awards, such as multiple cars, based on a single wager.

It should be appreciated that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

at least one display device;

at least one input device; and at least one processor configured to operate with the at least one display device and the at least one input device to:

(a) display a base game operable upon a wager by a player;

(b) display an outcome for the base game;

(c) determine if a triggering event occurred in the outcome of the base game;

(d) if a triggering event occurred in the outcome of the base game, display at least two of a plurality of selections associated with a bonus game, wherein the plurality of selections include:

(i) when a first amount of credits is wagered on each of a plurality of paylines in the base game, a first number of said selections associated with one of a plurality of different credit values and a second number of said selections associated with a type of selection outcome which is not a credit value, and (ii) when a second amount of credits, which is different than the first amount of credits, is wagered on each of the plurality of paylines in the base game, a third number of said selections associated with one of said plurality of different credit values and a fourth number of said selections associated with a type of selection outcome which is not a credit value, wherein said second number is different than said fourth number;

(e) enable the player to pick a designated number of the selections, wherein the designated number of picks of the selections is based, at least in part, on the amount of credits wagered on each of the plurality of paylines in the base game, said designated number being at least one, and wherein different designated numbers of picks of the selections are based on different wager amounts for the plurality of paylines in the base game;

(f) display at least one award based on at least one selection outcome associated with one of the picked selections.

2. The gaming device of claim 1, wherein the type of a plurality of the selection outcomes is based on the amount wagered per payline in the base game.

3. The gaming device of claim 1, wherein the type of selection outcome associated with at least one of the selections is an activation of a secondary display device.

4. The gaming device of claim 3, wherein the secondary display device includes a symbol generator.

5. The gaming device of claim 4, wherein at least one symbol generated by the symbol generator is a product award symbol.

6. The gaming device of claim 5, wherein a product award is provided to the player if a predetermined number of product award symbols is generated by the symbol generator.

7. The gaming device of claim 6, wherein if less than the predetermined number of product award symbols is generated by the symbol generator, a different award is provided to the player.

8. The gaming device of claim 4, wherein the symbol generator includes a plurality of reels.

9. The gaming device of claim 3, wherein the type of a designated number of selection outcomes associated with the selections is the activation of the secondary display device if a designated wager is made in the game.

10. The gaming device of claim 1, wherein a designated number of selection outcomes are associated with the selections if a designated wager is made in the base game.

11. A gaming device comprising:

at least one display device;

at least one input device; and at least one processor configured to operate with the at least one display device and the at least one input device to:

(a) display a base game operable upon a wager by a player;

(b) display an outcome for the base game;

(c) determine if a triggering event occurred in the outcome of the base game;

(d) if the triggering event occurred in the outcome of the base game, initiate a bonus game including at least two of a plurality of player-selectable selections associated with a play of the bonus game, wherein said plurality of player-selectable selections include:

(i) when a first amount of credits is wagered on each of a plurality of paylines in the base game, a first number of said selections associated with one of a plurality of different credit values and a second number of said selections associated with an activation of a symbol generator, and (ii) when a second amount of credits, which is different than said first amount of credits, is wagered on each of the plurality of paylines in the base game, a third number of said selections associated with one of said plurality of different credit values and a fourth number of said selections associated with said activation of said symbol generator, wherein said second number is different than said fourth number;

(e) enable the player to pick a designated number of the selections, wherein the designated number of picks of the selections is, at least in part, based on the amount of credits wagered on each of the plurality of paylines in the base game, said designated number being at least one, and wherein different designated numbers of picks of the selections are based on different wager amounts for the plurality of paylines in the base game;

(f) display an award associated with at least one of the selection outcomes; and (g) provide a jackpot award to the player if a plurality of jackpot award symbols are generated by the symbol generator.

12. The gaming device of claim 11, which includes a plurality of awards, wherein each said award is associated with one of the plurality of selection outcomes.

13. The gaming device of claim 12, wherein the type of selection outcomes associated with the plurality of selections is only credit values if the player wagers less than a predetermined amount in the base game.

14. The gaming device of claim 11, wherein the symbol generator includes a plurality of reels.

15. The gaming device of claim 14, wherein the type of selection outcome associated with the plurality of selections which causes the activation of a symbol generator includes causing an activation of the plurality of reels if the player wagers a predetermined amount in the base game.

16. The gaming device of claim 11, wherein the jackpot award is provided to the player only if the jackpot award symbols are generated by the symbol generator.

17. The gaming device of claim 11, which includes a modifier associated with at least one of the jackpot award symbols if at least one, but not all, of said jackpot award symbols is generated by the symbol generator.

18. The gaming device of claim 17, wherein the modifier includes a multiplier.

19. The gaming device of claim 11, wherein the jackpot award includes a product award, wherein said product award is provided to the player if the jackpot award symbols are generated by the symbol generator.

20. A method of operating a gaming device including at least one display device, at least one input device, and at least one processor, said method comprising:

(a) enabling a player to make a wager on a base game via the at least one input device;

(b) causing the at least one display device to display an outcome for the base game;

(c) causing the at least one processor to determine if a triggering event occurred in the outcome of the base game;

(d) if a triggering event occurred in the outcome of the base game, displaying at least two of a plurality of player-selectable selections associated with a bonus game, said plurality of player-selectable selections including:

(i) when a first amount of credits is wagered on each of a plurality of paylines in the base game, a first number of said selections associated with one of a plurality of different credit values and a second number of said selections associated with a type of selection outcome which is not a credit value, and (ii) when a second amount of credits, which is different than said first amount of credits, is wagered on each of the plurality of paylines in the base game, a third number of said selections associated with one of said plurality of different credit values and a fourth number of said selections associated with a type of selection outcome which is not a credit value, wherein said second number is different than said fourth number;

(e) enabling the player to pick a designated number of the selections, wherein the designated number of picks of the selections is based, at least in part, on the amount of credits wagered on each of a plurality of paylines in the base game, said designated number being at least one, and wherein different designated numbers of picks of the selections are based on different wager amounts for the plurality of paylines in the base game;

(f) providing an award to the player based on at least one of the selection outcomes associated with the picked selections.

21. The method of claim 20, which includes associating a plurality of selection outcomes with the selections, wherein the selection outcomes are based on the amount wagered per payline in the base game.

22. The method of claim 20, wherein the type of selection outcome associated with the picked selection is an activation of a secondary display device.

23. The method of claim 22, wherein the activation of the secondary display device includes generating at least one symbol on the secondary display device by a symbol generator.

24. The method of claim 23, which includes providing the player a product award if a predetermined number of product award symbols is generated by the symbol generator.

25. The method of claim 24, which includes associating a different award with each product award symbol if less than the predetermined number of product award symbols is generated by the symbol generator.

26. The method of claim 23, wherein the symbol generator includes a plurality of reels.

27. The method of claim 22, which includes associating the activation of the secondary display device with a designated number of selection outcomes associated with the selections if a designated wager is made in the base game.

28. The method of claim 20, which includes associating a designated number of selection outcomes with the selections if a designated wager is made in the base game.

29. The method of claim 20, wherein the steps (a) to (g) are provided through a data network.

30. The method of claim 29, wherein the data network is an internet.

31. A method of operating a gaming device having at least one display device, at least one input device and at least one processor and a base game operable upon a wager by a player, said method comprising the steps of:

(a) initiating a bonus game;

(b) causing the at least one display device to display at least two of a plurality of player-selectable selections associated with the bonus game, wherein said plurality of player-selectable selections include:

(i) when a first amount of credits is wagered on each of a plurality of paylines in the base game, a first number of said selections associated with one of a plurality of different credit values and a second number of said selections associated with an activation of a symbol generator, and (ii) when a second amount of credits, which is different than said first amount of credits, is wagered on each of the plurality of paylines in the base game, a third number of said selections associated with one of said plurality of different credit values and a fourth number of said selections associated with said activation of said symbol generator, wherein said second number is different than said fourth number;

(c) enabling the player to pick a designated number of the selections via the at least one input device, wherein the designated number of picks of the selections is at least in part based on the amount of credits wagered on each of a plurality of paylines in the base game, said designated number being at least one, and wherein different designated numbers of picks of the selections are based on different wager amounts for the plurality of paylines in the base game;

(d) displaying the selection outcome associated with each picked selection;

(e) causing the at least one processor to activate the symbol generator if the type of selection outcome associated with a picked selection includes the activation of the symbol generator; and (f) providing the player an award based at least in part on the selected selections and on the symbols generated by the symbol generator.

32. The method of claim 31, wherein the type of selection outcome associated with the plurality of selections is only credit values if the player wagers less than a predetermined amount in the base game.

33. The method of claim 31, which includes associating a plurality of awards with at least one of the plurality of selection outcomes.

34. The method of claim 31, wherein the activation of the symbol generator includes activating a plurality of reels if the player wagers a predetermined amount in the base game.

35. The method of claim 34, which includes modifying any award generated on the reels if, at least one, but not all, of the product award symbols are generated by the symbol generator.

36. The method of claim 31, wherein a predetermined number of said symbols include a product award symbol, wherein a product award is provided to the player if the product award symbols are generated by the symbol generator.

37. The method of claim 31, wherein the steps (a) to (g) are provided through a data network.

38. The method of claim 37, wherein the data network is an internet.

* * * * *

UNITED STATES PATENT AND TRADEMARK OFFICE

CERTIFICATE OF CORRECTION

PATENT NO. : 7,666,086 B2
APPLICATION NO. : 10/660809
DATED : February 23, 2010
INVENTOR(S) : Anthony J. Baerlocher It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1167 days.

Signed and Sealed this

Seventh Day of December, 2010

David J. Kappos

*Director of the United States Patent and Trademark Office*

UNITED STATES PATENT AND TRADEMARK OFFICE

CERTIFICATE OF CORRECTION

PATENT NO. : 7,666,086 B2
APPLICATION NO. : 10/660809
DATED : February 23, 2010
INVENTOR(S) : Anthony J. Baerlocher It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1167 days.

In Claim 1, Column 15, line 47, insert --and-- after “game;”.

In Claim 20, Column 17, line 46, insert --and-- after “game;”.

In Claim 29, Column 18, line 10, replace “(g)” with --(f)--.

In Claim 37, Column 20, line 3, replace “(g)” with --(f)--.

Signed and Sealed this

Twenty-first Day of December, 2010

David J. Kappos

*Director of the United States Patent and Trademark Office*